May 3, 1966 P. GOLDEN 3,249,381
FOOD CONVEYORS FOR HOSPITAL USE
Filed Jan. 27, 1964 2 Sheets-Sheet 1

INVENTOR
PHILIP GOLDEN
BY

ATTORNEY.

May 3, 1966  P. GOLDEN  3,249,381
FOOD CONVEYORS FOR HOSPITAL USE
Filed Jan. 27, 1964  2 Sheets-Sheet 2

INVENTOR
PHILIP GOLDEN
BY

ATTORNEY.

United States Patent Office 3,249,381
Patented May 3, 1966

3,249,381
FOOD CONVEYORS FOR HOSPITAL USE
Philip Golden, 124 W. 79th St., New York 24, N.Y.
Filed Jan. 27, 1964, Ser. No. 340,322
3 Claims. (Cl. 296—22)

This invention relates to food conveyors, and more particularly to food carrying trucks such as used in hospitals and especially in pediatric establishments.

One of the objects of the invention is a food conveyor which is effective in simultaneously storing and carrying hot food as well as cold food, and which at the same time is easily accessible and operable when being moved from one room into another and which at the same time in structure, appearance, size and shape is adapted to be operated in relatively crowded localities such as hospitals, and where many persons and especially children are to be served quickly and yet attractively at predetermined times and under predetermined conditions.

A more specific object of the invention is to provide a food conveyor consisting substantially of two compartments arranged one behind the other along a substantially horizontal axis; one forward compartment being substantially cylindrically formed around said horizontal axis, and one rear compartment substantially prismatically shaped, the two compartments being provided with doors at its front and rear ends and adapted to store cold and hot food, respectively; wheels being provided at both sides of the two-compartment structures to permit its movements.

In a more specific embodiment of the invention, the two compartments are made of contiguous plastic material such as polyester resin forming the outer wall and provided with appropriate insulation walls inside thereof to produce the desired hot and cold storage functions.

As a further object of the invention, the entire conveyor is constructed in the form of an old-fashioned railroad engine.

Figure 1:
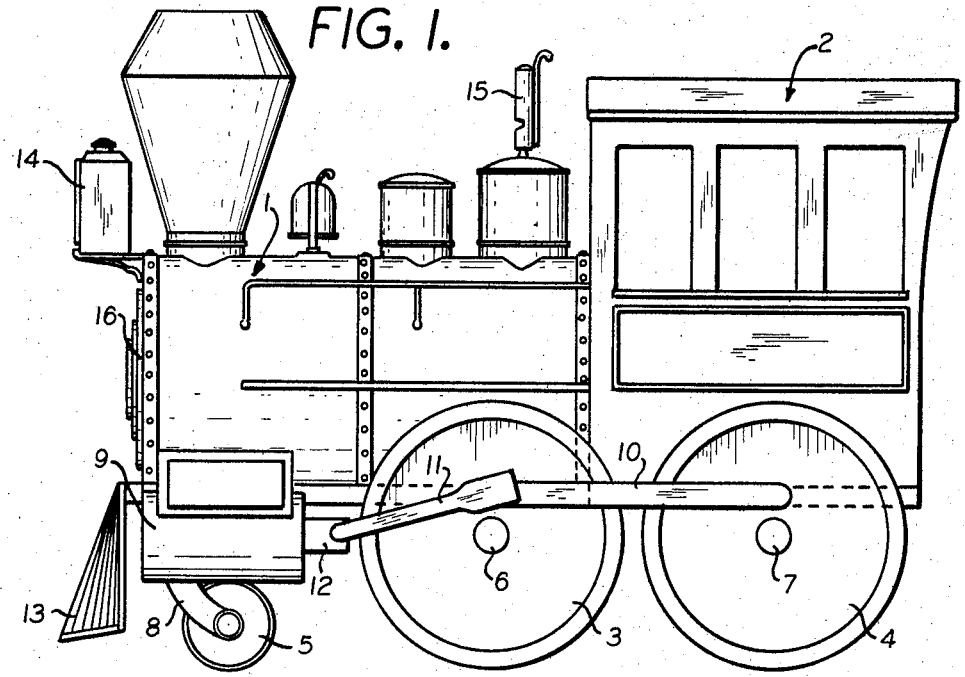
Figure 2:
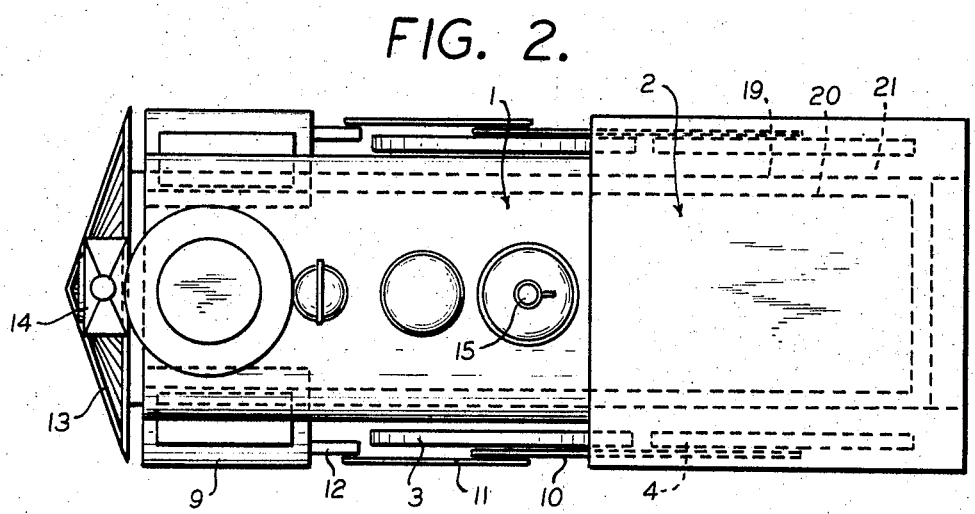
Figure 3:
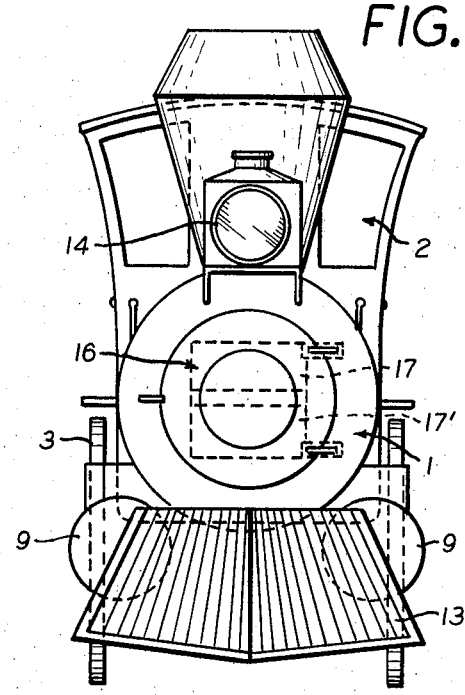
Figure 4:
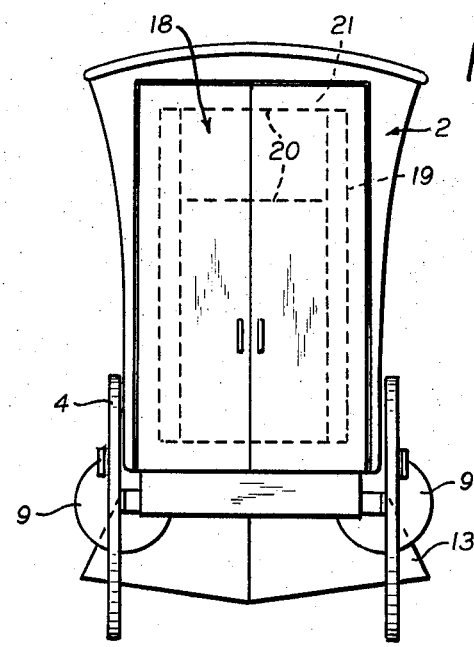

These and other objects of the invention are more fully apparent from the drawings annexed hereto, in which FIG. 1 represents the side view of a food conveyor in accordance with the invention; FIG. 2 shows a corresponding top view and FIGS. 3 and 4 front and rear views from opposite directions, respectively, on an conveyor such as illustrated in FIG. 1.

As apparent from FIGS. 1 and 2, the food conveyor consists of a cylindrical front portion 1 and an adjoining prismatic rear portion 2 forming a unitary structure and molded if necessary of a single piece of polyester resin.

The entire structure is supported on relatively large rear wheels 3 and 4 and relatively smaller front wheels 5. Rear wheels 3 and 4 are supported on shafts 6, 7, respectively, which are attached to the bottom of unitary structure 1, 2 in a manner not shown and believed to be irrelevant for the invention. Front wheels 5 are supported on swivels schematically indicated at 8 and also attached to the cylindrical portion 9 of unit 1, 2 in an appropriate manner not shown.

In order to accentuate the steam engine appearance of the conveyor, wheels 3, 4 are connected by a tie bar 10 which operates through a lever 11 the plunger 12 of cylinder 9 in order to simulate the steam engine function as much as possible; all elements including parts 9 through 12 can be made of plastic and especially polyester resin.

As apparent from FIGS. 1 and 2, the conveyor is also provided with a front safety bumper 13 and in order further to enhance its apperaance, it is equipped with a projection lamp 14; and at 15 with a compression type or bellows operated warning whistle. Whistle 15 may be operated in a known manner to indicate to the young patients that the food conveyor is approaching the ward. The two compartments of the conveyor 1, 2, as apparent from FIGS. 3 and 4, can be opened from the front and the rear, respectively, compartment 1 by means of a hinged access door 16. Arranged within compartment 1 are two insulated slide-out containers parallely arranged and provided with a lid and schematically indicated at 17, 17', which could serve as a container for milk. At the rear portion shown in FIG. 4, hinged doors schematically indicated at 18, permit removal of the hot food located in this prismatic container 2.

As apparent from FIG. 2, the entire storage room is provided with a unitary preferably plastic lining consisting of a fiberglas reinforced polyester resin schematically indicated at 19. Between lining 19 and the outer walls of compartments 1, 2, an insulation 21 is formed by foaming into the desired space polystyrene or similar material in otherwise well known manner; inside the space formed by lining 19, there are arranged one or more removable frames schematically indicated at 20 to support the food containers which are in transit.

While the invention has been shown and described by way of specific shapes, elements, attachments and arrangements, it is not limited thereto but may be applied in any form or manner whatsoever without departing from the scope of this invention.

What I claim is:

1. In a hospital food conveyor, a vehicular body in the shape of an old fashioned railroad locomotive consisting of two compartments arranged one behind the other along a common horizontal axis and attached to each other, the forward compartment being of substantially cylindrical shape surrounding said axis, and the rear compartment being substantially of prismatic shape, each of said compartments being provided with means for gaining access thereinto and the two compartments being formed of a continuous piece of polyester resin forming the outer wall and equipped inside thereof with a continuous lining defining a storage space for hot and cold food, respectively; the space between said lining and outer wall being filled with an insulating foaming plastic, the two compartments forming a single movable unit and being provided with means permitting to be wheeled from one place into another.

2. An insulated food conveyor comprising; a first insulated compartment of substantially cylindrical shape, a second insulated compartment arranged behind said compartment, said second compartment being substantially of prismatic shape, means for gaining access into each of said compartments, both of said compartments being mounted on a single movable unit in the form of an old fashioned steam locomotive and an operative whistle means located on said movable body to indicate meal times.

3. A hospital food conveyor according to claim 2 wherein said first and second compartments are formed of a continuous piece of polyester resin forming the outer wall thereof and wherein both of said compartments are equipped on the interior thereof with a continuous lining defining a storage space, the space between said lining and said outer wall being filled with an insulating foaming plastic.

References Cited by the Examiner

UNITED STATES PATENTS 1,979,459  11/1934  Huckel _____ 296—22 X

FOREIGN PATENTS 77,404    7/1919  Austria.
380,446   5/1940  Italy.
542,998   3/1956  Italy.

BENJAMIN HERSH, Primary Examiner.

P. GOODMAN, Assistant Examiner.